United States Patent [19]

Witte

[11] Patent Number: 5,790,889

[45] Date of Patent: Aug. 4, 1998

[54] METHOD OF SELECTING POINTING DEVICE IN A COMPUTER COMPRISING RESPONSIVE TO A RECONFIGURATION EVENT, INDENTIFYING ALL CONNECTED POINTING DEVICES AND SELECTING ONE OF THE DEVICES

[75] Inventor: Kendall C. Witte, Austin, Tex.

[73] Assignee: Dell U.S.A., L.P., Round Rock, Tex.

[21] Appl. No.: 960,544

[22] Filed: Oct. 31, 1997

Related U.S. Application Data

[63] Continuation of Ser. No. 514,215, Aug. 11, 1995, abandoned.

[51] Int. Cl.$^6$ ..................................................... G06F 3/033
[52] U.S. Cl. ........................... 395/828; 345/163; 345/167
[58] Field of Search ..................................... 395/290, 829, 395/304, 182.11, 828, 825, 893; 345/167, 156, 163; 473/457; D14/114

[56] References Cited

U.S. PATENT DOCUMENTS

| | | | |
|---|---|---|---|
| 4,939,772 | 7/1990 | Goto | 473/457 |
| 5,157,384 | 10/1992 | Greanias et al. | 345/156 |
| 5,280,276 | 1/1994 | Kwok | 345/167 |
| 5,317,693 | 5/1994 | Cuenod et al. | 395/829 |
| 5,420,989 | 5/1995 | Maher, III et al. | 395/290 |
| 5,491,788 | 2/1996 | Cepulis et al. | 395/182.11 |
| 5,530,893 | 6/1996 | Sugi | 395/825 |
| 5,544,333 | 8/1996 | Frazier et al. | 395/304 |
| 5,669,015 | 9/1997 | Chidester et al. | 395/893 |

*Primary Examiner*—Thomas C. Lee
*Assistant Examiner*—David Ton
*Attorney, Agent, or Firm*—Haynes and Boone, L.L.P.

[57] ABSTRACT

A method of reselecting a pointing device for a computer in response to a reconfiguration event. The computer has a CPU, a coprocessor, and first and second ports. The coprocessor selects one of the first and second ports for sending and receiving commands to a pointing device coupled to the one port. The reselection method includes the steps of: identifying all attached pointing devices; resetting all attached pointing devices; choosing an attached pointing device; and setting the chosen pointing device to the correct state.

10 Claims, 1 Drawing Sheet

METHOD OF SELECTING POINTING DEVICE IN A COMPUTER COMPRISING RESPONSIVE TO A RECONFIGURATION EVENT, INDENTIFYING ALL CONNECTED POINTING DEVICES AND SELECTING ONE OF THE DEVICES

This is a continuation of application Ser. No. 08/514,215 filed on Aug. 11, 1995, abandoned.

TECHNICAL FIELD

This invention relates to computer systems which use pointing devices, and in particular to personal computers for which the pointing device may be removed or replaced.

BACKGROUND OF THE INVENTION

Switching a pointing device, especially between an embedded device and an external device, has required user intervention to reconfigure the pointing device. This intervention may be relatively painless (e.g., run a setup program), or onerous (e.g., reboot).

SUMMARY OF THE INVENTION

The present invention allows the user to switch between embedded and external devices with no intervention. The present invention is method of reselecting a pointing device for a computer in response to a reconfiguration event. The computer has a CPU, a coprocessor, and first and second ports. The coprocessor selects one of the first and second ports for sending and receiving commands to a pointing device coupled to the one port. The reselection method includes the steps of identifying all attached pointing devices; resetting all attached pointing devices; choosing an attached pointing device; and setting the chosen pointing device to the correct state.

In another feature of the invention, the coprocessor periodically sends a command to the selected pointing device. If the coprocessor detects that the comand was not sent successfully, or if no response is received, the coprocessor perceives this as a reconfiguration event, and therefore reselects another device to be used as the pointing device.

In another feature of the invention, the coprocessor reselects another device to be used as the pointing device if unsolicited data arrives from a deselected device.

In another feature of the invention, when the coprocessor receives data from the pointing device, if the pointing device produced the data in response to a command from the CPU, the coprocessor passes the data unmodified to the CPU. When the coprocessor receives data from the pointing device, if the pointing device did not produce a reliable data stream, the coprocessor reselects another device to be used as the pointing device.

BRIEF DESCRIPTION OF THE DRAWINGS

The above-noted and other aspects of the present invention will become more apparent from a description of the preferred embodiment when read in conjunction with the accompanying drawings. The drawings illustrate the preferred embodiment of the invention. In the drawings the same members have the same reference numerals.

DETAILED DESCRIPTION OF THE PREFERRED EMBODIMENT

Figure 1:
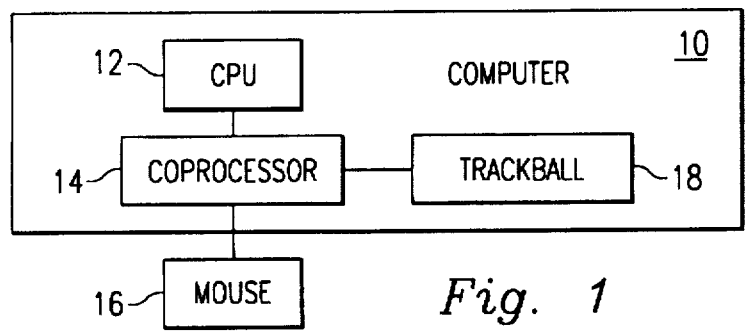
FIG. 1 is a schematic plan view of a computer having a coprocessor coupled to both a mouse and a trackball.

FIG. 1 is a schematic plan view of a computer 10 which includes a central processing unit, or CPU 12. The CPU 12 is conductively coupled to an input/output coprocessor 14, which in the preferred embodiment is an Intel Model No. 80C51SL processor. The coprocessor 14 handles the input and output processing for the computer 10. The coprocessor 14 is coupled to a mouse 16. The coupling can be wires, an infrared signal, a radio signal, etc. In the preferred embodiment, it is wires.

The coprocessor 14 sends commands to the mouse 16, and receives data from the mouse 16. The coprocessor 14 is coupled in a similar manner to a trackball 18, sends commands to the trackball 18, and receives data from the trackball 18. The mouse 16 and the trackball 18 are known as pointing devices, and in the preferred embodiment, the mouse 16 is an external pointing device, and the trackball 18 is an embedded pointing device.

Both the mouse 16 and the trackball 18 use the PS/2 protocol. This means application and operating system software need not reconfigure when a user switches between the mouse 16 and the trackball 18. All reconfiguration work is done in the coprocessor 14. Both the mouse 16 and the trackball 18 can be attached to the coprocessor 14 simultaneously. Only one of these devices is the selected pointing device. The coprocessor 14 tracks the states of the selected pointing device. This is done by recognizing commands before they are passed on to the selected pointing device, either the mouse 16 or the trackball 18.

In the preferred embodiment, the trackball 18 is always present. Therefore, device selection consists of the coprocessor 14 determining whether an external pointing device is attached. If an external pointing device is present, such as the mouse 16, the coprocessor 14 selects it. If no external pointing device is present, the coprocessor 14 selects the trackball 18.

However, in an alternate embodiment, the trackball 18 may be removeable, and therefore the coprocessor 14 determines whether either a trackball 18 or a mouse 16 is present, and selects the preferred pointing device. If no pointing device is present, the coprocessor 14 tracks the state which a pointing device would have, to be prepared for whenever a pointing device is eventually attached.

The coprocessor 14 selects the pointing device at device attachment and at device removal. The coprocessor 14 recognizes a device attachment in the following way. When a device recognizes that it has been physically attached to the system (it receives power from the system), the PS/2 protocol specifies the device shall send a BAT (Basic Assurance Test) completion code to the system. Receipt of this code from any device as the first byte of a data packet (or when the device is not the selected pointing device) will cause the coprocessor 14 to select a new pointing device.

The coprocessor 14 recognizes a device removal in the following three ways. First, a new pointing device is selected when the current pointing device delivers only a partial packet. This sometimes allows the coprocessor 14 to determine a device has been removed. Second, the PS/2 protocol allows the system to recognize that a command sent to a device has not been received. A failed attempt by the coprocessor 14 to send a command to the pointing device will cause a new pointing device to be selected. Commands are normally sent as part of the system boot process and as part of the system resume. Third, the coprocessor 14 periodically sends an ECHO (EEh) command to the pointing device to verify that it is still present. If it is no longer present, the coprocessor 14 selects a new pointing device.

When the coprocessor 14 recognizes that a device has been attached (i.e., when it receives a BAT), the coprocessor 14 first sends a RESET command to the device, then sends a READID command to the device to verify that the device is a PS/2 style pointing device, and finally issues a sequence of commands to put it in the same state as the previously selected device.

Figure 2:
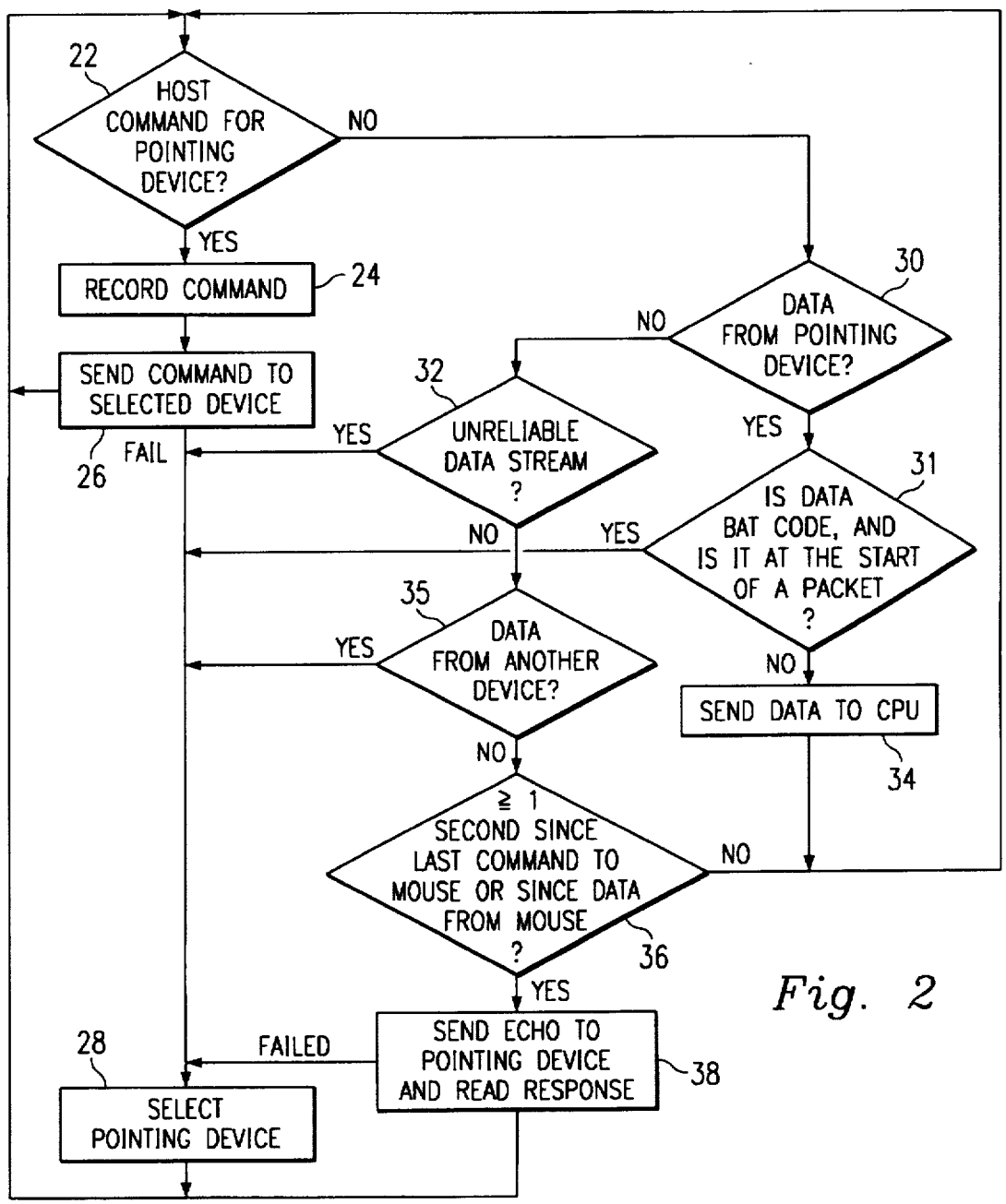
FIG. 2 is a flow chart depicting a first part of the method of the present invention.

Referring now to FIG. 2, a flow chart depicting the method of the present invention is shown. In step 22 the coprocessor 14 checks whether there is a command from the CPU 12 for the pointing device. If there is a command, then in step 24, the coprocessor 14 records the command.

The coprocessor 14 uses seven different Boolean variables to track and record the state of the pointing device. In these variable names, "mouse" refers to the selected pointing device. The variable names and the states they represent are shown in the table below:

| Variable Name | Values and States Represented |
| --- | --- |
| Mouse Enable | Zero at reset or after "Disable" command sent. One after "Enable" command sent. |
| Mouse Report Rate | Zero after reset. One after rate command sent. |
| Mouse Reset | One in the power-on state, or whenever the last command was to reset the mouse. |
| Mouse Resolution | Zero after reset. One after "Resolution" command sent. |
| Mouse Scale | Zero at reset, or after "Reset scale" command sent. One after "Set scaling 2-to-1" command sent. |
| Mouse Stream | Zero at reset, or after a "Remote" command sent. One if "Stream" command sent. |
| Mouse Wrap | Zero at reset, or after "Reset Wrap" command sent. One if "Enable Wrap" command sent. |

The coprocessor 14 also uses two integer variables to track and record the state of the pointing devices: "Mouse Resolution", for data sent with the resolution command; and "Mouse Rate", for data sent with the rate command.

In step 26 the coprocessor 14 sends the command to the pointing device. If the sending of the command was successful, then the coprocessor 14 returns to step 22 to service the next event. If the sending was not successful, it is perceived as a reconfiguration event by the coprocessor, and therefore in step 28 the coprocessor 14 selects a new pointing device, and then returns to step 22 to service the next event.

In step 28, the coprocessor 14 actually performs four actions. First, the coprocessor 14 sends out a READ_$_{ID}$ command to each port to identify all attached pointing devices. The coprocessor 14 then sends a RESET command to each attached pointing device. Then, the coprocessor 14 selects one of the pointing devices. Finally, the coprocessor 14 sets the selected device to the correct state.

Referring again to step 22, if there was no command from the CPU 12, then in step 30 the coprocessor 14 checks for data from the selected pointing device. If there is data from the pointing device, then in step 31 the coprocessor 14 asks if the data is BAT code, and if the data is at the start of a packet. If both conditions are true, then the coprocessor 14 goes to step 28 to select a new pointing device. If one of the conditions is not true, then in step 34 the coprocessor 14 sends the data to the CPU 12, and then returns to step 22.

Referring back to step 30, if there is no data from the selected pointing device, then in step 32 the coprocessor 14 asks if the pointing device delivered an unreliable data stream. If so, it is perceived as a reconfiguration event by the coprocessor, and therefore the coprocessor 14 goes to step 28.

If step 32 did not detect an unreliable data stream, then in step 35 the coprocessor 14 checks for data from another device. If there is data, it is perceived as a reconfiguration event by the coprocessor, and therefore the coprocessor 14 goes to step 28. If there is no data, the coprocessor 14 goes to step 36.

In step 36 the coprocessor 14 asks if one second or more has elapsed since the last command from the CPU 12 to the pointing device, or since data was last received from the pointing device. If one second or more has not elapsed, then the coprocessor 14 returns to step 22 to service the next event. If one second has elapsed, then in step 38 the coprocessor 14 sends an ECHO command to the pointing device and reads the response. If the command was not sent successfully, or if no response was read, it is perceived as a reconfiguration event by the coprocessor, and therefore the coprocessor 14 goes to step 28. Otherwise, the coprocessor 14 returns to step 22.

Although an illustrative embodiment of the invention has been shown and described, other modifications, changes and substitutions are intended in the foregoing disclosure. For example, the invention is not limited to necessarily executing steps 36 and 38. Also, the invention is not limited to only two attached pointing devices. The method of the present invention will work with any number of attached or embedded pointing devices, and will work with any combination of such pointing devices. The coprocessor 14 does not have to use the BAT code to detect the attachment of an external pointing device—a manual switch may be used to signal the coprocessor 14. Accordingly, it is appropriate that the appended claims be construed broadly and consistently with the scope of the invention.

What is claimed is:

1. A method of selecting one and only one a pointing device in a computer comprising a CPU and a coprocessor, and having an embedded pointing device connected thereto, the method comprising the steps of:

responsive to a reconfiguration event, identifying all pointing devices connected to the computer;

subsequent to the step of identifying, resetting all the identified pointing devices;

subsequent to the step of resetting, selecting one of the identified pointing devices, said step of selecting further comprising:

if an external pointing device is connected to the computer, selecting the external pointing device; and if an external pointing device is not connected to the computer, selecting the embedded pointing device;

setting the state of the selected pointing device to that of the previously selected pointing device; and if the selected pointing device does not respond to the step of setting, selecting another one of the identified pointing devices and setting the other selected pointing device to that of the previously selected pointing device, wherein said reconfiguration event comprises connection of the external pointing device to or disconnection of the external pointing device from the computer.

2. The method of claim 1, wherein the step of setting comprises the following steps by the coprocessor:

receiving a command from the CPU;

recording the command;

sending the command to the selected pointing device; and responsive to a failure of the sending step, recording the failure.

3. The method of claim 1, wherein the reconfiguration event comprises the following steps by the coprocessor:

periodically sending an echo command to the pointing device; and upon a failure of the sending step, recording the failure and choosing another one of the identified pointing devices and setting the other pointing device to the correct state.

4. The method of claim 1, wherein the step of setting comprises receiving a BAT (Basic Assurance Test) completion code as the first byte of a data packet.

5. The method of claim 1, wherein the step of setting comprises receiving data from one of the pointing devices other than the selected pointing device.

6. In a computer having a first processor and a second processor and having an embedded pointing device connected thereto, a method of enabling the second processor to selectively activate one of the embedded pointing device and an external pointing device connected to the computer, the method comprising the steps of:

determining whether an external pointing device is connected to the computer;

responsive to a determination that an external pointing device is connected to the computer, activating the external pointing device;

responsive to a determination that an external pointing device is not connected to the computer, activating the embedded pointing device; and responsive to a reconfiguration event, activating the other one of the embedded and external pointing devices;

wherein the reconfiguration event comprises receiving an unreliable data stream from the selected one of the pointing devices.

7. The method of claim 6 further comprising the steps of:

if the activated one of the pointing devices does not respond to signaling, activating the other one of the pointing devices.

8. The method of claim 6 wherein each of the pointing devices assumes a plurality of different states in response to commands from the computer, the method further comprising the steps of:

tracking the effect that each command would have on the inactivated one of the pointing devices; and upon activation of the previously inactivated one of the pointing devices setting the previously inactivated one of the pointing devices to the state in which it would have been if it had always been selected.

9. The method of claim 6 wherein only one of the input devices is activated at any single time.

10. A computer comprising:

an embedded pointing device;

a port for enabling the connection of an external pointing device to the computer;

a central processor; and an interface device for selectively interfacing the first and second input device with the central processor by performing the steps of:

determining whether an external pointing device is connected to the computer;

responsive to a determination that an external pointing device is connected to the computer, activating the external pointing device;

responsive to a determination that an external pointing device is not connected to the computer, activating the embedded pointing device; and responsive to a reconfiguration event, activating the other one of the embedded and external pointing devices;

wherein the reconfiguration event comprises receiving an unreliable data stream from the selected one of the pointing devices.

* * * * *